(No Model.)
J. G. WHITLOCK.
STOVE DOOR HANDLE.
No. 312,940. Patented Feb. 24, 1885.
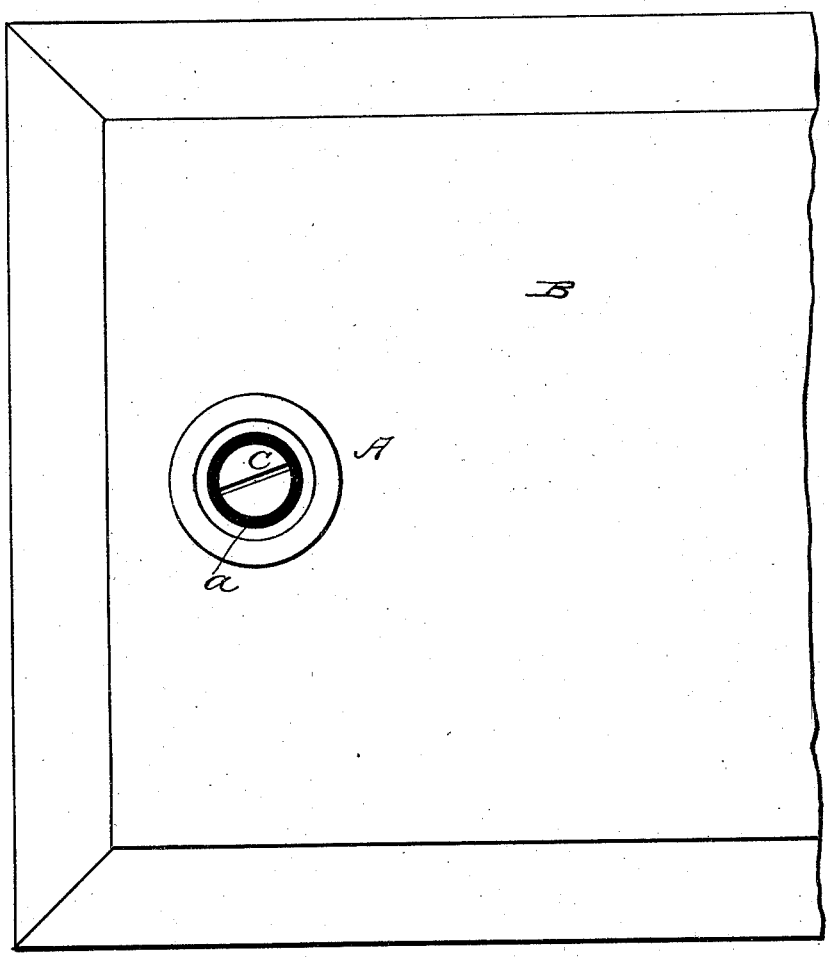
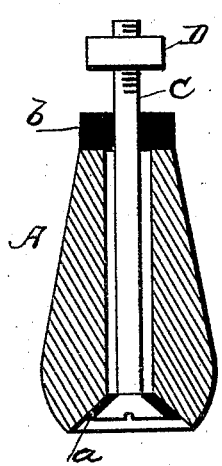
WITNESSES
INVENTOR
J. G. Whitlock,
by Anderson & Smith
his ATTORNEYS

UNITED STATES PATENT OFFICE.

JAMES G. WHITLOCK, OF RICHMOND, VIRGINIA.

STOVE-DOOR HANDLE.

SPECIFICATION forming part of Letters Patent No. 312,940, dated February 24, 1885.

Application filed May 10, 1884. (No model.)

*To all whom it may concern:*

Be it known that I, JAMES G. WHITLOCK, a citizen of the United States, residing at Richmond, in the county of Henrico and State of Virginia, have invented certain new and useful Improvements in Stove-Door Handles; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a front view. Fig. 2 is a sectional view in detail.

This invention relates to an improvement in handles for stove-doors, or elsewhere where it is desirable to have an insulated handle in connection with a heated object—as in laundry-irons, &c.; and it consists in the construction and novel arrangement of devices, as will be hereinafter set forth and claimed.

In the accompanying drawings, the letter A represents the handle, and B the stove-door or other heated object with which the handle is connected. The handle may be of metal or wood, wood being preferable, as the metal would be heated somewhat by radiation from the stove. The handle is connected with the stove by means of the screw-bolt C and nut D. The head of the screw-bolt is countersunk in the handle, leaving a recess to prevent contact of the hand with the head. The diameter of the shank of the screw is somewhat smaller than the bore in the handle, so that being properly centered it does not come in contact with the wall of the bore of the handle. Under the head of the screw is placed a layer of asbestus, $a$, and between the inner end of the handle and the door is another layer of asbestus, $b$, thus insulating the handle from the heated object.

When the handle is made of metal, it should be hollow and perforated circumferentially, as shown in Fig. 1 of the drawings.

Having thus described my invention, what I claim as new, and desire to secure by Letters Patent, is—

The combination of the insulated handle A, the connecting screw-bolt C, having its head countersunk in the outer end of the handle, and its shank properly centered and slightly smaller in diameter than the bore in the handle, and the layers of asbestus $a$ and $b$ under the head of the bolt and under the inner end of the handle A, substantially as and for the purpose set forth.

In testimony whereof I affix my signature in presence of two witnesses.

JAMES G. WHITLOCK.

Witnesses:
 JOEL COOK,
 W. A. RICKS.